United States Patent [19]

McLarty

[11] 3,713,678

[45] Jan. 30, 1973

[54] FASTENER
[75] Inventor: Shirley McLarty, Hutchins, Tex.
[73] Assignee: Cary Products, Inc., Hutchins, Tex.
[22] Filed: Dec. 7, 1970
[21] Appl. No.: 95,587

[52] U.S. Cl. .............................287/189.36 D, 85/5 R
[51] Int. Cl. ...........................F16b 5/02, F16b 19/00
[58] Field of Search .........85/5 R, 8.3, 5 CP, 5 N, 80, 85/DIG. 2, 8.1, 3 S, 7; 24/214, 213 R, 208 A; 287/189.36 D, 189.36 F

[56] References Cited

UNITED STATES PATENTS

| 1,376,002 | 4/1921 | Carr | 24/214 |
| 2,699,960 | 1/1955 | Callery et al. | 85/DIG. 2 |
| 2,593,790 | 4/1952 | Pietzsch | 85/7 |
| 3,220,078 | 11/1965 | Preziosi | 85/5 R X |
| 2,927,386 | 3/1960 | Day | 85/8.3 X |

FOREIGN PATENTS OR APPLICATIONS

| 480,998 | 3/1958 | Great Britain | 85/5 R |

Primary Examiner—Ramon S. Britts
Attorney—Thomas D. Copeland, Jr.

[57] ABSTRACT

A threadless fastener made of a partially flexible material, such as plastic, that may be inserted through aligned openings in adjacent pieces or parts for joining the parts together, wherein the fastener includes a partial head at one end that snaps into place and binds against one part, and includes a head at the other end that binds another part and holds the parts together until such time as the fastener is deliberately released.

6 Claims, 8 Drawing Figures

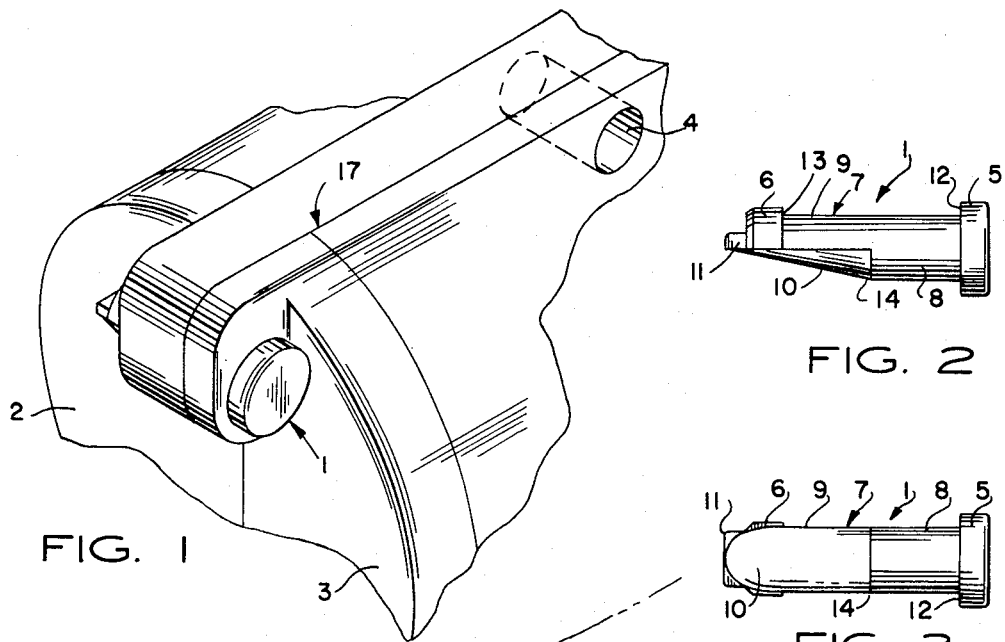
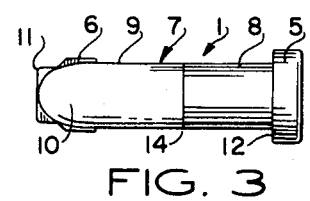
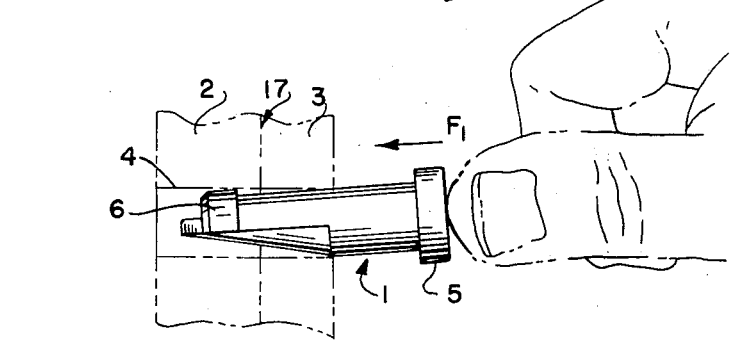
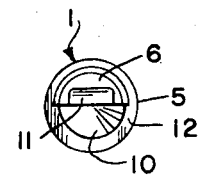
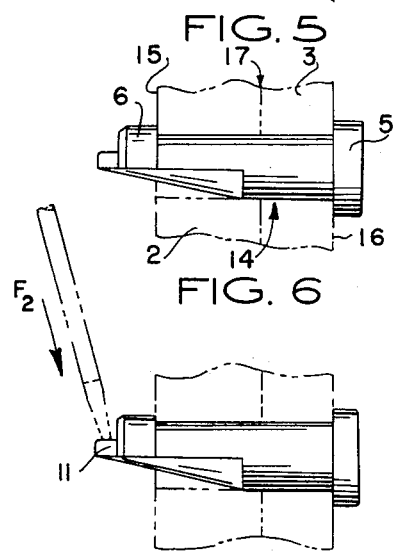
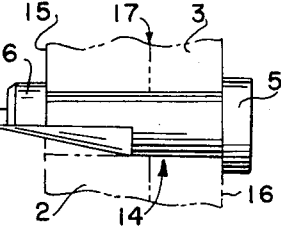
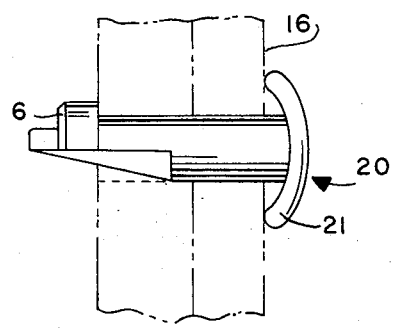

FASTENER

BACKGROUND OF THE INVENTION

1. Field of the Invention

This invention relates generally to locking fasteners having a flexible element, and more particularly to one-piece fasteners made of plastic material that can be inserted manually with or without the aid of hand tools.

2. Statement of the Prior Art

The prior art discloses locking fasteners that engage and attach adjacent plate-like members together, but for the most part these fasteners either include threads, or require separate pieces, such as nuts, cotter pins, and/or lock washers, or they include movable or deformable elements to assist in the holding function.

Examples of such prior art devices may be seen in the following patents:

U.S. Pat. No. 2,144,882 to Johnson is for a snap fastener stud which includes a rigid button-like head inserted over a sheet metal strip formed to have two projections that are squeezed together to pass through an opening and then expand to engage the interior wall and shoulder against the outer wall of an engaged member.

U.S. Pat. No. 2,146,649 to Pierce is for a spring loaded fastener particularly adapted for fastening license plates to a mount. A notch in the fastener holds the spring against the mount until disengaged.

U.S. Pat. No. 2,804,796 to Devine shows a multi-part partially threaded bolt for insertion into a blind hole, whereupon the addition of a threaded nut causes a shoulder on the bolt to engage the back side of the blind hole by expansion of separable parts of the bolt, or by manipulating the nut on the opposite surface from the blind hole.

U.S. Pat. No. 3,093,220 to Modrey is a multi-part cam type fastener that employs an elastic member on one side of the plates being fastened to bind the plates together under the cam action.

While the prior art disclosures serve useful functions in the fastener art, none of them accomplish the applicant's purpose in the manner or with the structure of the applicant's invention.

SUMMARY OF THE INVENTION:

A principal object of this invention is to provide a simple, one piece body fastener having no moving parts (in the normal sense), and one that is capable of being completely installed either manually without tools of any kind or using readily available hand tools if desired.

Another object is to provide a one-piece fastener that is flexible or semi-flexible and may be pushed through a plurality of aligned holes in adjacent plates until reaching the back side of the last plate whereat it automatically snaps into place where it remains until forceably and deliberately disengaged.

A further object is to provide a plastic fastener that is readily moldable into a single piece member that may be used to join members together without the use of any tools or additional parts to speed up assembly operations for equipment being fastened.

And another object of this invention is to provide a flexible fastener that has a full diameter shank and full head at one end of the fastener and a special partial head and tapered shank at the other end of the fastener, so that the fastener may be easily inserted and easily removed from the engaged parts.

BRIEF DESCRIPTION OF THE DRAWINGS

FIG. 1 represents a fragmentary perspective view of two parts joined together by the fastener of this invention.

FIG. 2 is a side elevational view of the one-piece fastener of FIG. 1.

FIG. 3 is a bottom view of the fastener of FIGS. 1 & 2.

FIG. 4 is an end view of the above named fastener.

FIG. 5 is an operational view showing the parts to be joined in phantom outline and showing the fastener of this invention being manually inserted into the aligned holes of the adjacent members.

FIG. 6 is a view similar to FIG. 5, showing the fastener fully installed and securing the two adjacent parts together.

FIG. 7 is a view similar to FIG. 6, but showing the technique for removing the fastener from its holding position.

FIG. 8 is a view similar to FIG. 6 but showing a modified embodiment of this invention for use where a greater tolerance of thickness of the joined parts is desired.

DESCRIPTION OF ILLUSTRATED EMBODIMENT

This invention is particularly adapted to be constructed of a flexible or semi-flexible material, such as plastics, and particularly suited for use on rigid or semi-rigid materials, which also may be a form of plastics. Specific examples, by way of illustration, but not of limitation, of the type of plastics that may be used are as follows:

a. For the fastener, use: A B S, DELRIN, Nylon, etc.
b. For the parts to be joined: A B S, high impact polystyrene, etc.

Since all materials are flexible to some degree, even materials such as steel and non-ferrous metals and alloys may also be used for this fastener and for the parts to be joined, under proper conditions.

FIG. 1 shows one intended use for the fastener 1 of this invention. The members 2 and 3 are separable halves (although more than two parts may be employed) of a fan housing for an automotive air conditioner, and are of molded plastic construction. Members 2 and 3 include a large number of aligned apertures, in this case, holes 4, that receive fastener 1 at assembly to provide a securely attached fan housing that will withstand vibration and other forces in use.

FIG. 2 shows in a detailed view, that the fastener 1 is a single piece molded plastic structure that has an enlarged head 5 at one end and a semi-head or partial head 6 at the other end. The two heads 5 and 6 are separated by a shank 7 that is comprised of two sections, a full diameter section 8 and a section 9 that has a tapered underbody 10 that terminates at its juncture with lip 11 that projects outward from head 6. Head 5 has a vertical shoulder 12 and head 6 has a vertical shoulder 13, and these shoulders provide the holding means to secure the members 2 and 3 after fastener 1 has been inserted in hole 4 and is snapped into place.

FIG. 3 shows that in the molded fastener 1, the tapered underbody 10 blends into the balance of the section 9 leaving little more than the outline of lip 11 and head 6 visible from the bottom. At its right extremity, the taper 10 terminates at line 14, which plays an important part in the function of this fastener, which will be described hereafter.

FIG. 4 shows a view looking at the end of fastener 1 from the end containing lip 11, and from this view it is seen that head 6 is slightly smaller than head 5, and that the tapered underbody 10 joins lip 11 at the approximate horizontal centerline of the fastener.

FIG. 5 shows the fastener 1 being inserted into aligned holes 4 of adjacent parts 2 and 3. The thumb in the view signifies that this fastener may be installed entirely by hand and without tools of any kind. Of course, a piece of metal, wood or readily available hand tools may be used if the pressure on the assembler's thumb becomes unpleasant after continuous use. But no tools are required, since there is no thread to be tighten, no bolt to make up, or no cotter pin to spread, and this fastener is of one-piece construction and is entirely selfcontained. FIG. 5 further shows that the smaller head 6 has been tilted down slightly to permit its insertion in holes 4 and a continuous force F is applied to the head 5 to cause the head 6 and the bulk of the fastener 1 to pass on through the holes 4 until head 6 has cleared the far end of hole 4, at which point the head 6 will snap upward in response to the bending load that has been placed on the shank 7 when fastener 1 is forced through the hole 4.

FIG. 6 shows the position of fastener 1 after head 6 has snapped up its locking position whereat its inner shoulder 13 has engaged outer surface 15 of member 2 simultaneously with the engagement of shoulder 12 of head 5 with outer surface 16 of member 3. One important structural feature of the fastener for this type of installation is that of the relationship of the location of dividing line 14 and the interface line 17. The distance from shoulder 12 of head 5 and dividing line 14 of shank sections 8 and 9 is greater than the distance from outer surface 16 of member 3 and interface line 17 between members 2 and 3. Or to put it another way, the full diameter portion 8 of shank 7 is longer than the width of member 3 that engages head 5. The reason for this is that a point on line 14 becomes a fulcrum when head 6 has passed through hole 4 and its desired function is to permit head 6 to snap into engagement with outer face 15 of member 2, but if line 14 is still engaging member 3, a reactive force may occur to cause members 2 and 3 to move out of alignment. Whereas with the full diameter portion 8 of shank 7 engaging the holes 4 of both members 2 and 3, the two parts of hole 4 must remain in alignment, since the recommended clearance in this type installation is that the holes 4 are only two thousandths of an inch (0.002 inch) larger than the diameter of shank portion 8. Also the thickness of plates 2 and 3 is specified to be two thousandths of an inch shorter than the distance between shoulders 12 and 13 on shank 7.

If it should become desirable to remove fastener 1 from its engagement with members 2 and 3, this may be done as shown in FIG. 7, by applying a downward and inward force F₂ against the upper side of lip 11 using a piece of wood, metal, hand tools, or even a worker's fingernail. Once the top of head 6 has cleared the upper diameter of hole 6, it will not of its own accord snap back into engagement, but rather, the fastener 1 will be relatively loose in hole 4, and may be pushed back out through the holes 4 and be removed.

FIG. 8 shows a modified embodiment of the invention as fastener 20, wherein the head 5 is replaced by a dish shaped head 21. In this installation the two thousandths of an inch clearance in the length dimension is not critical, and the thickness of members 2 and 3 may be several thousandths of an inch greater than the recommended clearance, since head 21 being of a more flexible construction will expand and contract as required to snugly engage the outer face 16 of member 3. The balance of the construction of fastener 20 is the same as fastener 1.

From the foregoing description and examples it will be seen that there has been produced a device which substantially fulfills the objects of this invention as set forth herein. The invention is not limited to the exemplary construction herein shown and described, but may be made in many ways within the scope of the appended claims.

I claim:

1. A fastener arrangement comprising, in combination:
    a. a plurality of workpieces having aligned apertures,
    b. a homogeneous solid one-piece plug type fastener body construction disposed within said aligned apertures, including
    c. a first head at one end having a perimeter larger than said apertures,
    d. a single shank having a full dimension geometric solid portion with a continuous outer perimeter and a less than full dimension portion,
    e. one portion of said less than full dimension portion being coaxial with said full dimension portion and the remainder of said less than full dimension portion tapering inwardly from said full dimension portion to at least the end of said less than full dimension portion,
    f. said full dimension portion extending into the apertures of at least two of said workpieces,
    g. a second head at the opposite end of said shank smaller than said apertures and extending laterally beyond a portion of the perimeter of an adjacent aperture,
    h. an inner shoulder on each head facing each other in substantially parallel relationship,
    i. and the distance between said shoulders corresponding to the total thickness thru the apertures of said workpieces,
    j. said body being resilient whereby said shoulders will temporarily move out of their substantially parallel relationship when passing thru said apertures and will automatically regain their substantially parallel relationship and engage the outer surfaces of said workpieces when said second head has passed completely thru the workpieces.

2. A fastener arrangement as in claim 1, wherein said body is made of a flexible material.

3. A fastener arrangement as in claim 1, wherein said body is made of a plastic material.

4. A fastener arrangement as in claim 1, wherein said second head includes a lip protruding axially from its outer end.

5. A fastener arrangement as in claim 1, wherein each named head includes a vertical shoulder adjacent a joined workpiece, one of said shoulders being circular in area, said other shoulder being semi-circular in area.

6. A fastener as in claim 1, wherein said fastener arrangement is manually insertable in the workpieces to be joined without tools both into and through all said apertures.

* * * * *